United States Patent
Pansier (10) Patent No.: US 8,644,041 B2
(45) Date of Patent: Feb. 4, 2014

(54) PFC WITH HIGH EFFICIENCY AT LOW LOAD

(75) Inventor: Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 175 days.

(21) Appl. No.: 13/144,154

(22) PCT Filed: Jan. 14, 2010

(86) PCT No.: PCT/IB2010/050154
§ 371 (c)(1),
(2), (4) Date: Jul. 25, 2011

(87) PCT Pub. No.: WO2010/082172
PCT Pub. Date: Jul. 22, 2010

(65) Prior Publication Data
US 2011/0267856 A1     Nov. 3, 2011

(30) Foreign Application Priority Data
Jan. 14, 2009  (EP) .................................... 09100043

(51) Int. Cl.
H02M 5/42     (2006.01)
G05F 5/00     (2006.01)

(52) U.S. Cl.
USPC ............................................ 363/89; 323/299

(58) Field of Classification Search
USPC ......... 363/21.12, 21.14, 21.16–21.18, 40, 41,
363/81, 82, 89; 323/299
See application file for complete search history.

(56) References Cited

U.S. PATENT DOCUMENTS

| | | | |
|---|---|---|---|
| 5,132,606 A * | 7/1992 | Herbert | 323/266 |
| 5,847,942 A * | 12/1998 | Bazinet et al. | 363/25 |
| 6,137,700 A | 10/2000 | Iida et al. | |
| 7,042,743 B2 | 5/2006 | Pidutti et al. | |
| 7,292,013 B1 | 11/2007 | Chen et al. | |
| 7,295,452 B1 * | 11/2007 | Liu et al. | 363/82 |
| 7,397,678 B2 | 7/2008 | Frank et al. | |
| 7,511,460 B1 | 3/2009 | Chen et al. | |
| 7,580,272 B2 | 8/2009 | Taguchi et al. | |
| 7,733,678 B1 | 6/2010 | Notohamiprodjo et al. | |
| 7,944,153 B2 * | 5/2011 | Greenfeld | 315/291 |
| RE42,425 E * | 6/2011 | DeJonge et al. | 315/225 |

(Continued)

FOREIGN PATENT DOCUMENTS

EP        0 580 237 A1     1/2004
WO    WO-2005/120202 A2   12/2005

OTHER PUBLICATIONS

EPSMA, "Harmonic Current Emissions—Guidelines to the Standard EN 61000-3-2", Northants, UK, 7 pages (Sep. 2004).
International Search Report and Written Opinion for Int'l Patent Application PCT/IB2010/050154 (Apr. 29, 2010).

(Continued)

*Primary Examiner* — Timothy J Dole
*Assistant Examiner* — Yusef Ahmed (57) ABSTRACT

A Power Factor Corrector (PFC), typically used as the first stage of switched mode power supplies, particularly suited for Universal Mains inputs, is disclosed, along with methods for controlling a switched mode power supply having power factor correction. In order to increase efficiency, particularly under low load conditions, without undue degradation of the Power Factor, the switching of the PFC circuit is confined to one or more operating windows within each half-cycle. In example embodiments, the operating window comprises a small time window centered around the peak of the mains voltage. The higher the power level, the wider the switching window.

16 Claims, 5 Drawing Sheets

(922) Ratio Detect
(924) Ton Correction Block

(56) References Cited

U.S. PATENT DOCUMENTS

| | | | |
|---|---|---|---|
| 8,111,050 B2 | 2/2012 | Sutardja et al. | |
| 8,174,855 B2 | 5/2012 | Ribarich et al. | |
| 8,222,832 B2 * | 7/2012 | Zheng et al. | 315/291 |
| 2004/0047166 A1 | 3/2004 | Lopez-Santillana et al. | |
| 2004/0217742 A1 * | 11/2004 | Ribarich et al. | 323/222 |
| 2005/0207193 A1 | 9/2005 | Adragna | |
| 2005/0219871 A1 * | 10/2005 | Li et al. | 363/21.1 |
| 2006/0139020 A1 * | 6/2006 | Wood et al. | 323/283 |
| 2006/0198172 A1 * | 9/2006 | Wood | 363/89 |
| 2006/0255776 A1 * | 11/2006 | Fishbein et al. | 323/259 |
| 2007/0279955 A1 | 12/2007 | Liu et al. | |
| 2008/0246444 A1 | 10/2008 | Shao et al. | |
| 2009/0141524 A1 | 6/2009 | Fagnani et al. | |
| 2009/0251934 A1 * | 10/2009 | Shteynberg et al. | 363/81 |
| 2010/0141178 A1 * | 6/2010 | Negrete et al. | 315/307 |
| 2011/0157940 A1 | 6/2011 | Zhang | |

OTHER PUBLICATIONS

Lai, J-S, et al. "Design Consideration for Power Factor Correction Boost Converter Operating at the Boundary of Continuous Conduction Mode and Discontinuous Conduction Mode" Proc. Applied Power Electronics Conf. & Exposition, pp. 267-273 (1993).

Datasheet, "MC33368 High Voltage GreenLine Power Factor Controller", On Semiconductor, 16 pgs. (Apr. 2000).

Kim, J.W. et al. "Variable On-Time Control of the Critical Conduction Mode Boost Power Factor Correction Converter to Improve Zero-Crossing Distortion", Int'l. Conf. on Power Electronics and Drive Systems, pp. 1542-1546 (2005).

Datasheet, "TEA1751T; TEA1751LT GreenChip III SMPS Control IC", NXP Semiconductors, 29 pgs. (Jul. 2008).

Datasheet, "TEA1750 GreenChip III SMPS Control IC", NXP Semiconductors, 29 pgs. (Dec. 2008).

Datasheet, "TEA1742T GreenChip PFC Controller", NXP Semiconductors, 17 pgs. (Feb. 2009).

* cited by examiner

(922) Ratio Detect
(924) Ton Correction Block

Fig. 9

PFC WITH HIGH EFFICIENCY AT LOW LOAD

FIELD OF THE INVENTION

This invention relates to power supplies having power factor correction, and to methods of operating such power supplies. It is particularly relevant to power factor correction stages for switched mode power supplies. It further relates to methods of operating such power factor correction stages.

BACKGROUND OF THE INVENTION

Power supplies for electronic devices such as televisions, personal computers (PCs), audio equipment, and personal digital assistants frequently are required to supply DC output power. Increasingly for such applications switched mode power supplies (SMPS) are used. SMPS require a DC input bus voltage, which conventionally is provided by rectifying an AC supply such as a mains supply. However, since rectification is highly non-linear, it produces a high levels of harmonics, and results in a significant degradation of the power factor of the supply. The power factor is the ratio of the real power to the apparent power of the system.

As a result, it is increasingly common to include in power supplies such as SMPS, an input stage to operate as a power factor correction (PFC) stage.

Such PFC stages are useful in ensuring compliance of the application with legal requirements for the control of harmonic components, such as the European Union's regulation EN61000-3-2. They also can be beneficial in ensuring that the application is compliant with minimum power factor requirements such as the mandatory at least 90% power factor for PC supplies under the European Commission's "80+" directive.

In addition to being useful for or required by regulatory purposes, PFCs can be of benefit to the system designer, since they can be capable of providing a single bus voltage from universal mains voltages. Such a feature can be of value, in particular, for devices such as power supplies for laptops which can thereby automatically adjust for varying mains voltages, ranging from for example 100V in Japan to 240 in the UK. Moreover, a subsequent DC/DC converter stages can then be optimised for the specific bus voltage, which can result in either decreased costs or increased efficiencies or both.

Under light load conditions, where the load is less than say 50% of its normal level, a two-stage architecture having a PFC upstream of a DC/DC converter, typically suffers a considerable degradation in efficiency. This is particularly significant for very light loads such as between 1% and 5%, or 5% to 10% of the normal level. Such loads can frequently be encountered for instance, when a desktop pc is running only a word-processing or when a laptop has fully charged battery and the workload for the CPU is low. Since such devices can often be run at these very light loads for a high proportion of the use, the resultant waste of energy can be considerable. The efficiency degradation will be partly due to lower efficiency of the DC/DC converter at light load; however, decreases in efficiency of the PFC circuit are usually even worse.

Considering for the moment, Boundary Conduction Mode (BCM), it will be appreciated that to achieve at high inefficiency, the ratio of the transferred energy per cycle to the losses in that same cycle should be high. At low load, usually this is not the case, for two reasons: firstly, near to the zero crossing of the AC waveform and for low instantaneous input voltage in general, the switching frequency is very high, and yet the amount of transferred energy is low. Switching in this area of the AC voltage waveform is very inefficient—conversely, within each half cycle of the AC waveform, the instantaneous efficiency of a PFC circuit is highest when the instantaneous AC voltage is high. Secondly, at low load the peak inductor current is very low, and thus the influence of ringing time and the switching losses become increasingly dominant, since they are roughly proportional to current and frequency, and lowering of the load results in increasing the switching frequency.

A known way to address the above problems is by the introduction of a frequency clamp. A frequency clamp prevents the switching frequency from exceeding a predetermined value. As the load is decreased, this first becomes effective around the zero crossing of the AC supply. With further decrease in load, the fraction of the half-cycle during which the clamp operates increases. Ultimately, the clamp is active during the complete half cycle. Such frequency clamps are used for instance in NXP Semiconductor's product TEA1750. Such a solution is effective for intermediate levels of load; however it does not adequately address the problem for very low loads, since the ratio of transferred power per cycle to the losses is then the still far from optimal.

European patent application EP-A-0,580,237 relates to control of a PFC by means of adjusting the on-time on the AC half cycle by half cycle basis, but maintaining switching during the full half cycle. Switching around the zero crossing of the mains voltage is still present, and the efficiency loss due to that switching around the zero crossing is thus not resolved.

A second known way of addressing the above problems is to use burst mode operation. In burst mode, the PFC is active only during a certain time period. The period may either be preset or derived from the output voltage. The PFC is switched off at low load, and switched on again when the output voltage of the PFC circuit has dropped to a certain minimum value. Such a method is implemented in NXP Semiconductor's TEA1750 Green-Chip III systems. Although this increases the average efficiency considerably, a major drawback remains for some applications in that the output voltage varies significantly. Although some types of DC/DC converters such as flyback can handle this relatively easily, this is not the case for all converter types. For example LLC converters are less tolerant of input voltage variations. And although it is possible to design such a converter for high input voltage variations, this has a significant influence on the efficiency during normal operation, which materially detracts from one of the major benefits of this type of converter.

Moreover, the above known solutions are limited to the boundary conduction mode (BCM) control, and do not readily carry across to continuous conduction mode (CCM) control.

It would be therefore be desirable to be able to operate a PFC circuit to minimise the loss in efficiency at light load whilst avoiding some of the disadvantages of the known solutions.

SUMMARY OF THE INVENTION

It is an object of present invention to provide a method of operating a power factor correction the stage for a power supply, which is capable of operating at a high efficiency.

A method of operating a switched mode power supply having power factor correction and supplied from an AC supply stage, the method comprising defining at least one operating window entirely within a half-cycle of the AC supply, and switching the power supply within the half-cycle only during the at least one operating window and with an on-time and a switching frequency. By disabling the switching near to zero crossing, the efficiency of the power supply can be increased without unnecessary deterioration of the power factor.

In embodiments, there is a single window, and the operating window is such that a peak of the AC supply is included within the window. Other than in very specific circumstances, the peak of the AC supply is the time when the losses are relatively lowest, so this enables particularly high efficiencies. Alternatively, in an embodiment, the at least one operating window may comprise a first side-window and a second side-window, such that the first side-window lies to one side of a peak of the AC supply and the second side-window lies to the other side of the peak of the AC supply. This situation can be advantageous in specific circumstances where the output voltage is double the instantaneous input voltage.

In embodiments an output characteristic of the power supply is controlled by controlling the width of the operating window, and in particular embodiments, the output characteristic is one of output power, output current and output voltage.

In embodiments, the window is symmetrical about the peak of the AC supply. This minimises the efficiency drop which would occur from operating too close to the zero cross on either side of the peak supply. Further, very asymmetrical positioning of the window, by more than 5% or so, would lead to degradation of the power factor, which is, like the efficiency drop, disadvantageous.

In embodiments, the on-time is constant within the operating window. Further, in some embodiments, the on-time of the power factor controller is varied between either successive half-cycles or between successive cycles. Variation of the on-time of the switching is thus possible between AC cycles—or even within an AC cycle—which may provide an alternative or additional control of the output characteristic and in particular the output power.

In embodiments, a peak switched current is constant throughout the operating window. Further, in some embodiments, the peak switched current is varied between either successive half-cycles or between successive cycles. Similar to variation of the on-time, variation of the peak switched current is thus possible between AC cycles—or even within an AC cycle—which may provide another alternative or additional control of the output characteristic and in particular the output power. In embodiments in which one of the peak current average current, and on-time is varied within the window, the variation can beneficially be made such as to optimise the efficiency within a switching cycle. In preferred embodiments, this optimisation is for the highest efficiency per switching cycle.

In embodiments, the switching frequency is constant throughout the operating window. In alternative embodiments, jitter is introduced into the switching frequency. In yet further alternative embodiments, an output characteristic is controlled by controlling the switching frequency. In some embodiments, the switching frequency is constrained not to exceed a predetermined clamping frequency and further control is provided by controlling the width of the operating window. Thus switching frequency can be used as a further or alternative control means, and the operation may be combined with clamping of the switching frequency.

In embodiments a sample-and-hold function is carried out at the peak of the half-cycle of the AC supply. Alternatively or in addition, a sample-and-hold function is carried out at least one of the end and the start of the operating window. In embodiments, an output from the sample-and-hold function is used for determining the width of the operating window for a subsequent half-cycle of the AC supply. Sample-and-hold techniques provide a particularly simple and process-light means of testing for conditions under which it is appropriate to control the operating window.

In embodiments, the switched mode power supply is supplied with an input voltage and outputs an output voltage, and in the event that the input voltage is less than half the output voltage, the on-time is controlled in dependence on the ratio between the output voltage and the input voltage.

According to another aspect of the present invention there is provided a control circuit for a switched mode power supplied configured to operate according to a method as described above. Furthermore, in embodiments, there is provided a switched mode power supply comprising such a control.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Figure 1:
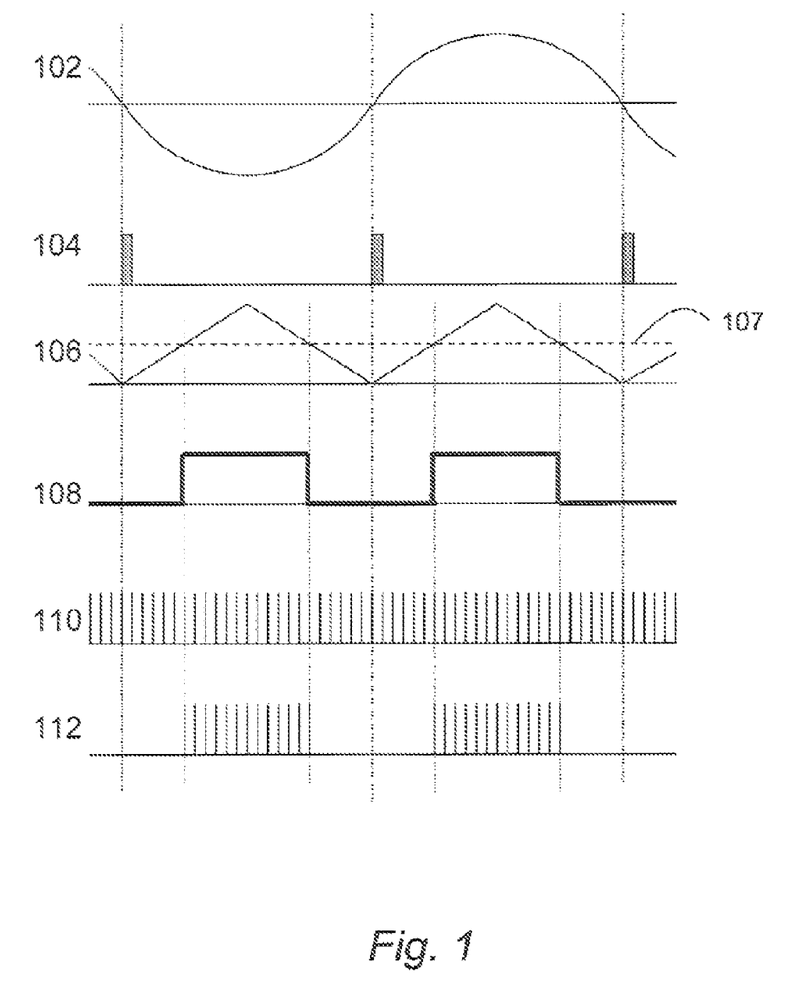
FIG. 1 shows a timing diagram of waveforms according to an embodiment of the invention.

FIG. 1 shows a timing diagram illustrating a first embodiment of the invention using a PFC in boundary conduction mode (BCM) operation of an SMPS. The skilled person will appreciate that BCM operation of a switch mode power supply corresponds to the mode where the output current follows a triangular shape in which it rises while the power supply's switch is closed, and then falls while the switch is open as the stored energy in an inductive component is discharged. The switch is closed immediately upon the current falling to zero: the SMPS is thus operating at the boundary between continuous conduction (CCM), wherein the switch would be closed before the current falls to zero, and discontinuous conduction (DCM), wherein the switch would not be opened until after the current falls to zero.

In the figure, waveform 102, shows an AC supply voltage, which may be for instance a mains voltage Vmain. The supply voltage follows the characteristic sinusoidal shape. At 110 is shown that the high-frequency oscillator output for the SMPS. In a conventional SMPS, the high frequency oscillator output is directly connected to the drive of the switch of the SMDS. However, according to this embodiment, the oscillator output is shuttered through an operating window. Thus, instead of the switch drive receiving a continuous high frequency control signal 110 from the oscillator, it receives a series of bursts of high frequency signal. These bursts are shown at 112; the drive receives the high frequency signal only during the windows when signal 108 is high.

In this embodiment, the operating window is symmetrical, for each half cycle of the mains voltage, around the mains voltage peak. Hereinafter the term "peak" will be used to refer to each a the positive peak, and a negative trough, that is to say, a peak of the negative signal, interchangeably. In order to determine the start and finish of the window, the zero crossing of the mains voltage is first detected. The zero crossing detector outputs a synchronisation pulse 104 whenever a zero crossing is detected. These pulses trigger a triangle generator, to produce a triangular waveform shown at 106. By calculating the time between successive synchronisation pulses, forcing the peak of the triangle generator to lie midway between the successive synchronisation pulses, and ensuring that the falling slope is equal in magnitude to the rising slope, the triangle waveform 106 is ensured to be symmetrical about the successive peaks in the mains waveform 102. The triangular waveform 106 output from the generator is compared to a threshold value 107 by means of an error amplifier. When the triangular chip waveform exceeds the threshold value, the operating window 108 is opened. The window remains open until the triangular waveform 106 falls below the threshold value, at which time at the operating window is closed.

Figure 2:
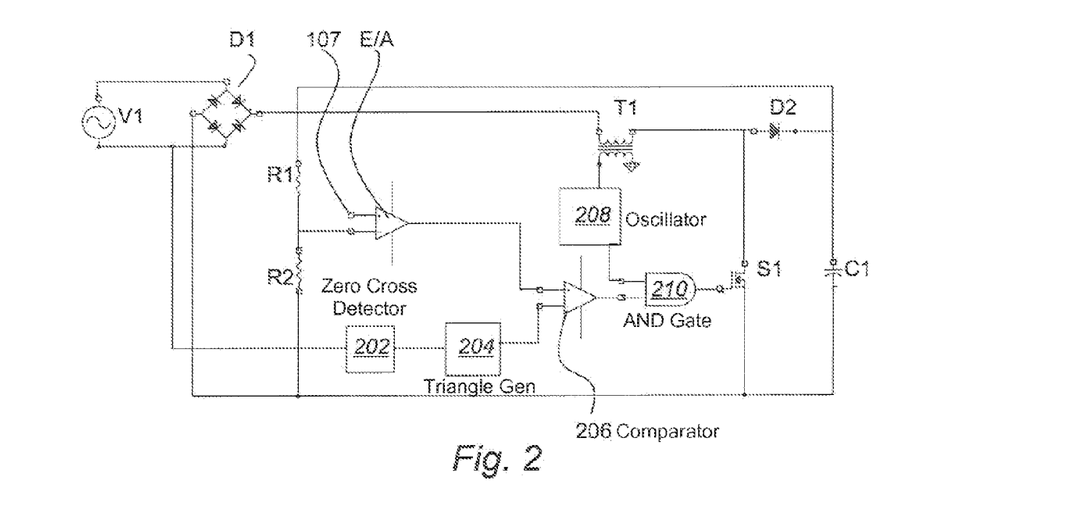
FIG. 2 shows a block diagram of a circuit, for implementing the timing diagram of FIG. 1.

A block diagram of a circuit which implements a first embodiment of the invention is shown in FIG. 2. An AC input voltage V1, which may be for instance a mains supply, is a rectified by means of a bridge rectifier D1, and fed to one side of the PFC choke transformer T1. The zero crossing of the AC voltage 102 is determined by zero cross detector 202 which is also fed from the AC voltage. Zero cross detector 202 outputs synchronisation pulse 104, which triggers the triangle generator 204. The output from the triangle generator 204 is fed to one input of comparator 206. The other input to comparator 206 is supplied from error amplifier. The error amplifier is implemented generally as shown in the embodiment shown in FIG. 2 by means of a sample and hold circuit (E/A). The voltage at the middle node of the voltage divider comprising a pair of resistor R1 and R2 is sampled, as this voltage is representation of the output voltage. The sampled value is fed to the positive input of operational amplifier (E/A), and a reference voltage, e.g. a 2.5V bandgap reference voltage is connected to the negative input. The operational amplifier is set to a pre-determined gain, and the output of the operational amplifier (acting thus as error amplifier) is fed to the window comparator 206. In a detailed implementation of the block circuit shown, as will be immediately appreciated by the skilled person, first the voltage is sampled at the peak of the mains, and then this value is transferred at the zero crossing of the mains using a second sample and hold circuit (not shown); the output from that second sample and hold circuit is fed to the error amplifier.

The comparator 206 is set to be high whenever the output of the triangle generator is higher than the output of the error amplifier. The output of the comparator 206 is fed to a AND gate 210 together with the output of an oscillator block 208.

The output of the AND gate is directed to switch S1 of the SMPS. Thus, only when the pulses originating from the oscillator fall within the window, will they act as driver for the SMPS switch S1. In operation, the level of the threshold value in the error amplifier E/A will control the width of the operating window 108. This in turn the controls the number of pulses from the high frequency oscillator which are used to drive switch S1, in each half cycle.

The skilled person that will appreciate that any other means for accurately measuring the phase of the mains may be used as an alternative to that described above. For instance, simply rectifying the mains and using the half sine wave for the comparison is also possible, although this is not preferred since at very low load the window comparator would have to compare the output voltage of the error amplifier with a voltage that is very flat, that is to say, which is not changing very fast. In that case, the resolution is likely to be bad, which could result in instability.

Also, the skilled person will appreciate that in order to control the width of the window, the triangular waveform 106, need not be symmetrical around the peak of the AC input voltage, such as is the case in the embodiment described above. An asymmetrical triangular waveform may alternatively be used: in such embodiments, the operating window need not to symmetrical about the peak of the AC input voltage: an asymmetrical operating window may alternatively be used. Furthermore, the invention is not limited to the use of a triangular waveform in order to determine the timing and the width of the operating window 108. Indeed the skilled person will appreciate that, embodiment of the invention extend to other waveforms, for instance, but without limitation exponential, sawtooth or sinusoidal waveforms.

Figure 3:
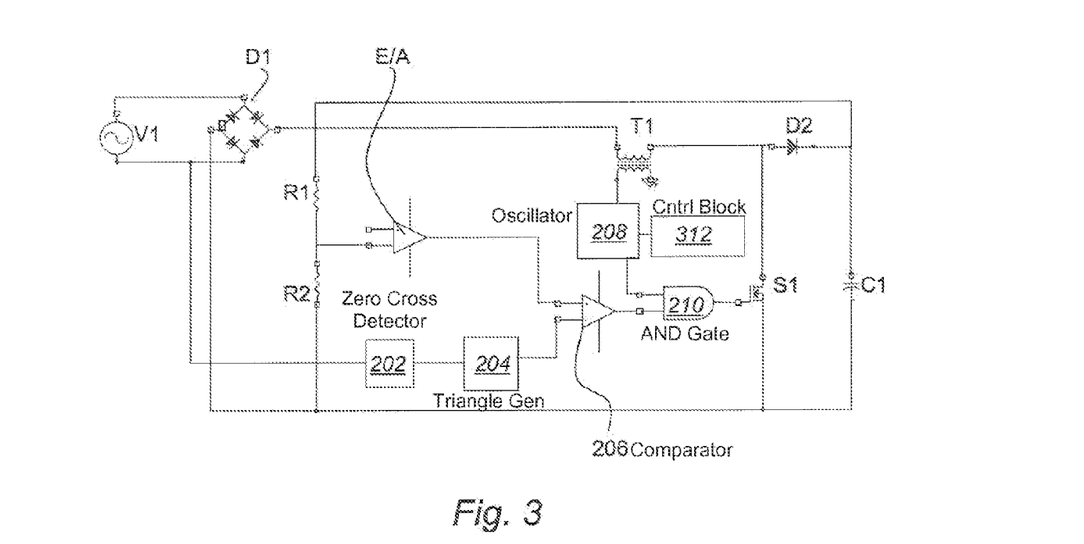
FIG. 3 shows a block diagram of a circuit for implementing a further embodiment of the invention which includes frequency clamping.

A block diagram of a further preferred embodiment of the invention is shown in FIG. 3. The circuit of FIG. 3 is generally similar to that of FIG. 2; however this embodiment differs from that shown in FIG. 2, in that this embodiment incorporates a further control block 312, which is effective to clamp the maximum frequency of the oscillator. In this embodiment, the concept of the operating window is combined with the known concept of a frequency clamp. The concept of frequency clamping of a PFC will be well known to the skilled person, and is implemented for instance, in known devices such as NXP Semiconductor's TEA1750. The output power of the SMPS increases with the switching frequency since a fixed quantum of energy is transferred for each switching operation, and increasing the frequency enables more switching operations to be carried out in unit time. A frequency clamp prevents the frequency from being increased beyond a predetermined upper limit; and thus limits the achievable power transfer.

It will be readily appreciated by the skilled person that the embodiment described above with reference to FIG. 3, can from one viewpoint be considered as a modified form of pulse frequency modulation (PFM). There may be circumstances in which it could be that when a PFC circuit is optimised for highest efficiency it may be possible to deliver the required amount of power, but not achieve a required power factor. In such a situation the width of the operating window can be artificially increased. Use of the frequency clamp will lead to a time difference, or gap, between successive switching cycles. As the total amount of switching cycles that are needed to deliver the required power will not change very much with this way of operation, the total timespan during which the power is delivered will be longer. That is to say, the effective operating window will require to be wider. In order to implement this, the control algorithm monitors the output voltage (not shown in the diagram). If the output voltage falls, indicative of inadequate power transfer, the control algorithm adjusts the operating window accordingly—by increasing the width of the window—to restore the output voltage to the expected level. Thus setting the clamp frequency enables to set the required power factor at a given power level, enabling adaptation to any specification. For instance when the optimal on-time setting would result in a switching frequency of 100 kHz and a window width of 1.5 ms at a given power level, whereas the SMPS is required to deliver a power factor of 0.9 at that given power level, reducing the frequency by means of a frequency clamp to 30 kHz would result in a 3.3 times larger window, i.e. window of 5 ms, resulting in the right window width to achieve PF of 0.9.

In a further embodiment, the concept of an operating window is used in conjunction with further method of controlling the output power of the SMPS. As will you will be known to the skilled person, the on-time of an SMPS switch can be varied in order to control the power delivered by the SMPS. This is readily implemented in applications in which on-time control is used for the SMPS; alternatively, in applications in which peak current control or average current control is used, rather than on-time control, the peak current can be varied instead of the on-time. In general, increasing the on-time in the case of the on-time control, or increasing the peak current or average current in the case of peak current or average current control, will increase the output power of the SMPS.

In this embodiment, two means of controlling the output power are thus provided—operating window width, and switching on-time. Either the operating window can be adjusted, or the on-time (or average or peak currents, in the case of current control rather than on-time control) adjusted, or both. However, as explained above, increasing the operating window to include the whole half-cycle (or almost the whole of the half cycle), would provide little additional power while significantly increasing the losses and thus degrade the efficiency. Effective control can thus be provided by limiting the width of the operating window to a predetermined maximum value, and utilising on-time control (or current control as appropriate) should a higher level of output power be required. In this case, at the window is preferably set just wide enough to allow for the necessary power factor—but no wider, since the wider the window the lower the efficiency.

Two methods of controlling the on-time, according to the above embodiment, will now be described with reference to FIGS. 4, 5 and 6.

Figure 4:
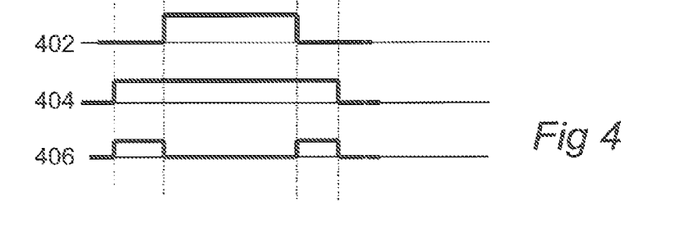
FIG. 4 shows the waveforms for providing a compensation signal for Ton, for on-time control.

FIG. 4 shows, at 402, a maximum operating window, set as described above to achieve the required power factor. The required window which is derived from the control circuit is shown at 404. If the required window derived from the control circuit is wider than the maximum operating window, then adjustment is made as follows: combining the inverse of the maximum operating window with the control-circuit-derived window in a logical AND circuit, results in the signal shown as 406. This signal 406 is proportional to the difference between the widths of the maximum window and the control-circuit-derived window. It can be averaged and added to the signal for the optimum on-time (Tonopt) to result in the new signal to set the on-time (Ton). Thus, the higher the level, the longer Ton becomes.

Figure 5:
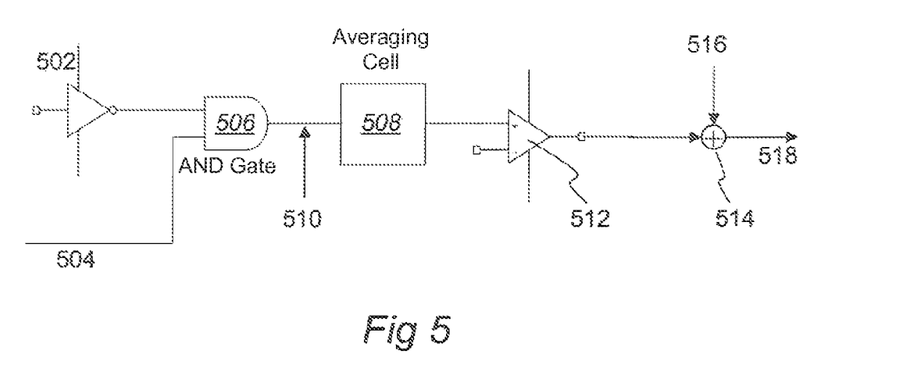
FIG. 5 shows a block diagram of a first method of implementing on-time adjustment.

A circuit which embodies this method is shown at FIG. 5. The maximum window is buffered and inverted at 502, and combined in AND gate 506 with the control-circuit-derived window 504. The resulting signal 510 is a window_difference signal, which is averaged in an averaging cell 508. In its simplest form, the averaging cell 508 can be a simple RC network; alternatively, it may be a more sophisticated circuit in which the various parameters such as different rise and fall time constants can be set. After suitable amplification in a gain cell 512, the signal is added to the optimum Ton signal Tonopt 516, to result in a new Ton signal 518.

In the case of current control (either peak current or average current) rather than on-time control, an analogous circuit is used to adjust the peak, or average, current, rather than Ton.

Figure 6:
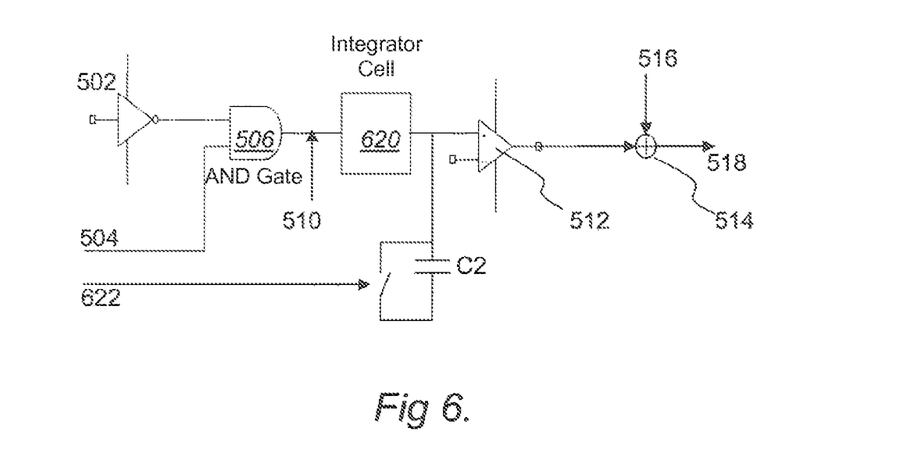
FIG. 6 shows a block diagram of a second method of implementing on-time adjustment.

A second, more preferred, circuit which embodies the method is shown at FIG. 6. This circuit is similar to that shown in FIG. 5 and described above; however, in this case, rather than being averaged, the output window_difference signal is integrated in integrator cell 620, before being amplified in a gain cell 512 and added to Tonopt as before. The integrator cell 620 is reset at the start of each half cycle by the zero cross detection signal (as shown in FIG. 2). In this way during each half cycle of the AC input, the on-time can be adjusted, yielding an improved transient behaviour as the averaging time constant has been eliminated. Of course, as for the circuit of FIG. 5, an analogous circuit can again be used to adjust the peak, or average, current, rather than Ton.

A further embodiment of the present invention will be described herebelow, which embodiment is particularly suited to situations where the output voltage from the SMPS is greater than twice the input voltage.

In order to provide a better understanding of this further embodiment and the embodiments described above, a theoretical and mathematical analysis of the efficiency and operation of a PFC controller operated in accordance with embodiments of the invention will now be given, before describing the further embodiment. It will be appreciated that the analysis is useful to further the skilled person's understanding of embodiments of the invention and shall not be taken to limit its scope.

The PFC efficiency is optimised by optimising the efficiency per switching cycle. This entails optimising the ratio between transferred power and losses.

The transferred power Ptransf:

$Ptransf=Iav*Vin$, where Vin is the input voltage, and the average current Iav equals half the peak current Ipeak such that Iav=Ipeak/2.

So $Ptransf=Vin*Ipeak/2$.

Losses in the coil consist of two contributions: winding losses and core losses. Winding losses are proportional to $Ipeak^2$. Core losses are proportional to the peak flux density (which is in turn proportional to (peak) and to the switching frequency. So for the same peak current it is advantageous to reduce the frequency.

The equivalent frequency within a switching cycle can be calculated to be proportional to Vout/(Vout−Vin), thus indicating that the higher Vin the lower the switching frequency.

The losses in the switch are proportional to the duty cycle and Ipeak. Ipeak=Vin*Ton/L, where L is the inductance of the coil, so for the same current Ton is minimal for Vin=maximum. Switching losses are basically proportional to the switching frequency, and the losses in the output diode are basically directly proportional to the total current, and thus to the power level. So the optimisation involves a balancing between the conductive losses and the switching losses. One can calculate that there is an optimum for a certain peak current through the coil, which depends from the actual components (series resistance, RDSon of FET etc.). Irrespective of what the optimum is, it is generally located at the peak voltage of the mains.

When switching at this optimal operation point, the amount of energy per switching cycle is fixed. So the total power to be transferred to the output then can be controlled by the number of switching cycles. Increasing the number of switching cycles means increasing the width of the switching window. Or, restated the other way round: the width of the window determines the amount of power delivered to the output.

The efficiency will only slightly decrease when the input voltage drops a little. So varying the window width hardly influences the efficiency, as long as the actual voltage is sufficiently high: of the order of magnitude of 50% of Vout, say.

Replacing the Ipeak control by Ton control leads to a resistive behaviour within the window (as long as genuine boundary conduction mode can be maintained)

In this way the efficiency of the PFC circuit will always be very high, as it operates only in optimal operation conditions.

Considering now the Power factor: the algorithm just proposed leads generally to a low power factor.

For a power factor of 0.9 it can be calculated that for 50 Hz systems the width of the window must be 5 ms; to achieve a power factor of 0.95, a width of 6 ms is required (with fixed Ton within a half cycle of the mains voltage).

The requirements for power factor and/or mains current harmonics are only valid at full load (or under rather well specified conditions, such as, for instance, for TV receivers). When operating in the optimal mode leads to too high power transferred, the algorithm can be adapted in such a way that (quasi) discontinuous conduction mode (DCM) with an almost fixed frequency is applied. Such an algorithm is used in known devices, such as NXP Semiconductor's TEA1750, which can operate with frequency clamping with valley skipping. A disadvantage is that one of the advantages of BCM—that of reduction in electromagnetic interference (EMI)—is thereby at least partially lost. This however can in turn be improved by introducing sufficient frequency jitter.

A mathematical analysis of the efficiency calculation and optimisation will now be given. The analysis will be split into two parts. First the situation where the output voltage is less than twice the input voltage will be considered (Vout<2*Vin); this will be followed by analysis of the situation at way out the output voltage is greater than twice the input voltage (Vout>2*Vin).

Figure 7:
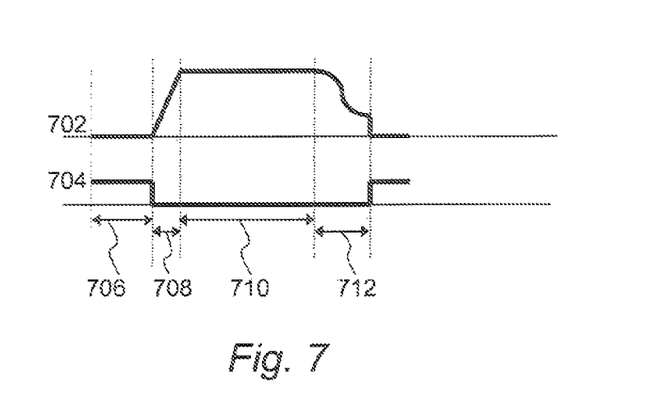
FIG. 7 shows a timing diagram of a switching cycle of a Boundary Conduction Mode boost converter.

First, consider the case where the output voltage is less than twice the input voltage (Vout<2*Vin). For BCM the waveforms are as shown in FIG. 7. The top trace shows to the drain-source voltage (Vds) across the SMPS switch; the bottom trace 704 relates to the measurable gate-source voltage (Vgs), which generally corresponds to whether the switch is on or off. Inside one switching cycle four intervals can be discerned:

(a) The switch on-time 706: this is the on-time of the switch, during which the current through the PFC choke is being build up. This time interval is also denoted herein as Ton.

(b) 708: the time after the switch-off of the switch, during which the voltage across the switch swings up to Vout. This interval is denoted as: Trise.

(c) 710: the time during which the output diode is conducting and power is transferred to the output. This interval is denoted as: Td.

(d): the time during which an oscillation occurs, given by the value of the PFC choke and the total effective capacitance, and ending when the voltage across the switch has reached its minimum. This interval is denoted as Tring.

For each of these intervals the losses can be calculated, and during interval (c) also the energy transferred to the output.

In the calculations below a MOSFET or FET is assumed to be the switch.

Furthermore:

$T_{on}$=on-time of the FET
L=inductance value of PFC choke
$R_L$=effective loss resistance of the choke (in this figure the losses of the windings and of the core are combined)
C=total effective capacitance apparent at the drain of the MOSFET
$R_{on}$=On-resistance of the FET (assumed to be constant during the on-time of the FET)
$V_F$=forward voltage of output diode (assumed to be constant during conduction)
$\omega$=ringing frequency caused by L and C:

$$\omega = \frac{1}{\sqrt{LC}}$$

During $T_{on}$:
Losses in the switch:

$$E_{FET,on} = \frac{V_{in}^2}{L^2} \cdot \frac{R_{on}}{3} \cdot T_{on}^3,$$

while the losses caused by the capacitance at the drain node amount to:

$$E_{FET,cap} = C\frac{(2V_{in} - V_{out})^2}{2},$$

and the losses associated to the driving of the FET, are assumed to be represented by:

$$E_{FET,drive} = V_{gate,max} \cdot Q_{gate},$$

and the losses in the coil:

$$E_{L,on} = \frac{V_{in}^2}{L^2} \cdot \frac{R_L}{3} \cdot T_{on}^3$$

At Switch Off:
The losses in the switch (a MOSFET is assumed) can be modelled as:

$$E_{FET,sw} = V_{in}V_{out}\frac{t_s T_{on}}{6L}$$

During $T_{rise}$:

$$E_{L,rise} = \omega R_L C^2 V_{in}^2 (1 + \omega^2 T_{on}^2)\frac{\omega T_{rise} + \sin 2(\omega T_{rise} + \arctg \omega T_{on}) - \sin(2\arctg \omega T_{on})}{2}$$

The current $I_{end}$ in the coil at the end of $T_{rise}$ differs from the peak current at the instant of switch-off of the FET, and equals:

$$I_{end} = \omega C V_{in}\sqrt{1+\omega^2 T_{on}^2} \cdot \sin(\omega T_{rise} - \arctg \omega T_{in})$$

During $T_d$:

$$E_{L,d} = \frac{R_l L I_{end}^3}{3(V_{out} - V_{in})}$$

During $T_{ring}$:

$$E_{L,ring} = R_L \left(\frac{C}{L}\right)(V_{out} - V_{in})^2 \frac{\pi}{2\omega}$$

The energy delivered through the output diode equals:

$$E_{out} = \frac{L \cdot I_{end}^2 \cdot V_{out}}{2(V_{out} - V_{in})},$$

and the losses in the output diode:

$$E_d = \frac{L \cdot I_{end}^2 \cdot V_f}{2(V_{out} - V_{in})},$$

The efficiency within a cycle can thus be derived to be:

$$Eff = \frac{E_{out} \cdot 100}{E_{out} + E_{FET,on} + E_{Fet,cap} + E_{FET,drive} + E_{FET,sw} + E_{L,on} + E_{L,rise} + E_{L,d} + E_{L,ring} + E_d}$$

In this way the optimal peak current (or on-time of the main switch) can be easily obtained by simple calculation.

This optimisation leads to a certain minimum energy transfer per cycle.

In the above case the value of the optimal peak current and/or the optimal on-time of the switch shows only a very small dependence on the actual ratio between Vin and Vout, and is usually between 1.5 and 2 µs An analysis of the situation where the output voltage is greater than twice the input voltage (Vout>2*Vin) will now be given. In this situation, the optimisation is different, and will be explained with reference to the waveforms shown in FIG. 8. In addition to the drain-source voltage (Vds) across the SMPS switch which is shown at 802, and the gate-source voltage (Vgs), which generally corresponds to whether the switch is on or off an shown at the bottom trace 804, is shown the coil current 803 in the middle trace.

Figure 8:
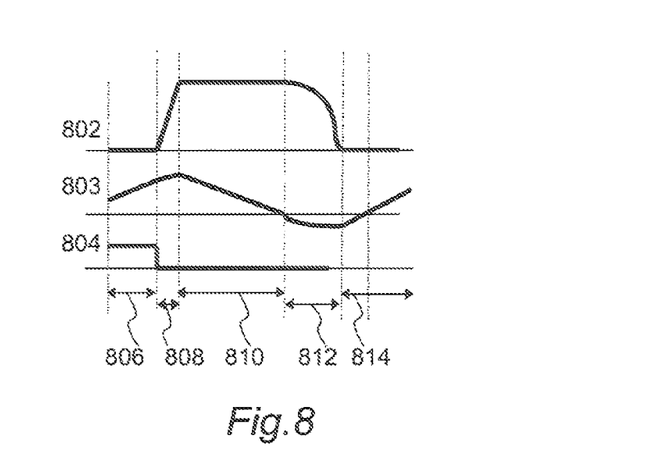
FIG. 8 shows a timing diagram of a switching cycle of a Boundary Conduction Mode boost converter having output voltage which is greater than twice the input voltage.

The loss formulae during the intervals Ton (806), Trise (808) and Td (810) remain the same. Interval Tring (812) however, has a shorter duration relative to that shown at 712 of FIG. 7, and an additional time Tneg, shown at 814, is introduced, during which the current though the coil is negative and also flows through the body diode of the MOSFET.

For the interval Tring the loss formula for the coil changes to:

$$E_{L,ring} = \frac{1}{2} \omega R_L C^2 (V_{out} - V_{in})^2 \left( \omega T_{ring} + \frac{V_{in} \sqrt{V_{out}(V_{out} - 2V_{in})}}{(V_{out} - V_{in})^2} \right)$$

and the losses during $T_{neg}$ are in the coil:

$$E_{L,neg} = R_L \frac{V_{in}^3 \cdot T_{neg}^3}{3L^2},$$

in which $T_{neg}$ equals:

$$T_{neg} = \frac{\omega LC \sqrt{V_{out}(V_{out} - 2V_{in})}}{V_{in}}$$

There are no capacitive switch-on losses, but in the FET additional losses occur due to the conduction of the body diode. The latter can be diminished however by proper timing of the switch-on instant, e.g. by detecting the instant that $V_{ds}$ reaches zero, or that $dV_{ds}/dt$ becomes zero (which will act as valley detection as well); both of these techniques will be known to the skilled person.

Assuming that this negative current flows through the FET's channel, then:

$$E_{FET,neg} = \frac{R_{on} V_{in}^2 T_{neg}^3}{3L^2}$$

The result becomes:

$$Eff = \frac{E_{out} \cdot 100}{E_{out} + E_{FET,on} + E_{Fet,neg} + E_{FET,drive} + E_{FET,sw} + E_{L,on} + E_{L,rise} + E_{L,d} + E_{L,ring} + E_{L,neg} + E_d}$$

Calculations for various values of the resistances and capacitances show that the optimal value of Ton (or (peak) this time does depend heavily on the ratio of Vin and Vout, and that the smaller Vin is with respect to Vout, the larger the optimal on-time becomes.

As a rule of thumb, simulations show that roughly Ton*Vin²=constant

An embodiment on the invention, which is particularly suited to situations with low input voltage (Vin) in which the output voltage may be more than twice the input voltage, will now be described with reference to FIG. 9.

Figure 9:
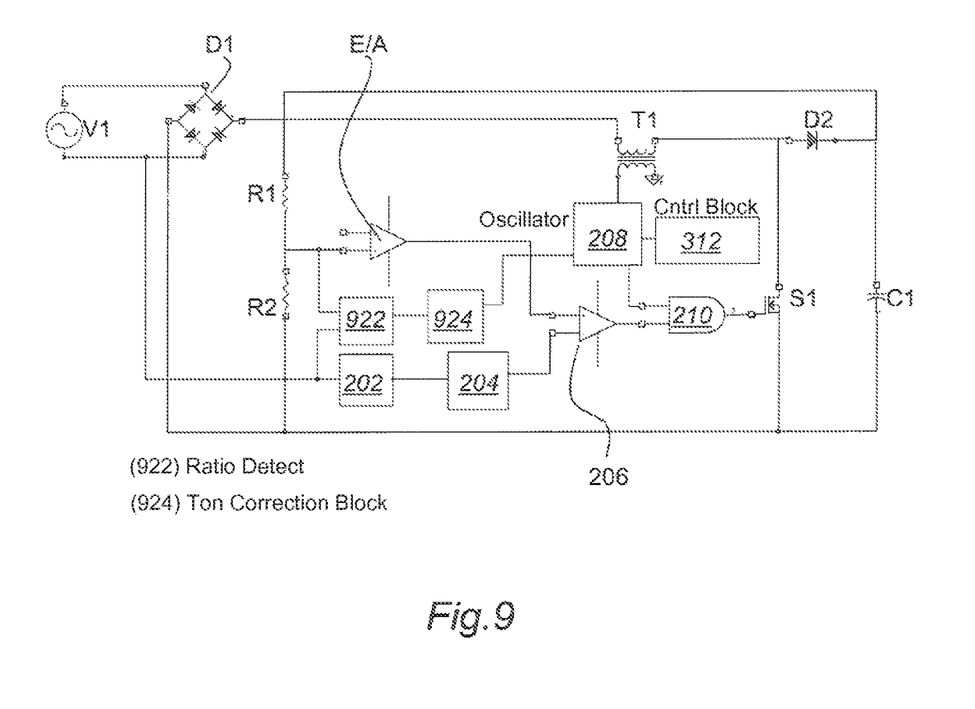
FIG. 9 shows a block diagram of a circuit for implementing a yet further embodiment of the invention which is particularly suited for low input voltage.

FIG. 9 shows a block diagram of a circuit corresponding to an embodiment of the invention. This circuit corresponds generally to that shown in FIG. 3; however in this case the circuit includes a ratio detector 922 connected between the potential divider comprised of resistors R1 and R2, and the un-rectified AC input. An output from the ratio detector 922 is input to a Ton correction block 924, an output of which is provided to the oscillator and on-time control 208.

In operation, the output voltage Vout is compared with the AC supply, or input, voltage Vin, in the ratio detector 922. This detector measures the ratio between the two voltages, and if the ratio Vout/Vin is less than or equal to 2, then its output remains inactive (low). However, whenever the ratio of the Vout/Vin exceeds 2, ratio detector block 922 outputs a signal or a voltage level to Ton correction block 924. The signal input to the correction block 924 provides a measure for the required increase of the on-time, as described about with reference to FIGS. 4, 5 and 6, and is used to adjust the on-time setting in the oscillator block. Of course, as discussed above, the skilled person will appreciate that either average of peak current control may, once again, be used as alternatives to the on-time control.

A further specific embodiment of the invention will now be described, which relates particularly to the situation where the instantaneous input voltage is half the output voltage, and the switching losses in the switch of a PFC can be completely eliminated. This situation can occur where all the RMS (root mean square) losses due to series resistances of the FET and the coil are very low, and also the capacitance across the switch (FET) is very large. In practice, to get significant differences between the efficiency at the peak of the mains and when the input voltage is only half the output voltage the capacitance would have to be so high as to be impracticable, and the resulting efficiency is slightly worse than when the capacitance is low, so this embodiment is not preferred. None-the-less, in very special rare cases the optimum efficiency is around that value, which is not the peak voltage in the mains half cycle. This situation will then appear at both sides of the peak of the mains (or other AC input) voltage, and the optimum operating window will be not a single window which includes the peak of the input voltage, but a pair of windows, one on either side of the peak voltage.

The embodiments above have been described generally in relation to fixed switching frequency. However, the skilled person will appreciate that the invention is not is so limited. In particular, the switching frequency may be subjected to jitter: as will been well known to those skilled in the art, jitter or frequency jitter is a method to slightly change the switching frequency over time, in such a way that the frequency is gradually decreased until a certain frequency (or percentage of the average frequency) is reached, whereafter the frequency is gradually increased until a predetermined maximum, wherefater the frequency gradually decreases, and so forth. Inter alia, an effect of the jitter is to reduce the perceived level of EMI (electromagnetic interference) distortion caused by the switching, by spreading the noise over a wider frequency band. This allows for a smaller, less expensive and less lossy EMI filter.

From the above disclosure, it will be appreciated by the skilled person of that when the operating window is wider, the optimal on-time of the switch although will vary slightly. Similarly, in the case that the actual mains or other AC input voltage varies over time, either one or both of the on-time of the switch or the width of the operating window may vary. Control by varying either one or both of these falls within the scope of the invention. Similarly, if average or peak current control is used rather than on-time control, then without limitation one or other or both of current control or window-width may be used to accommodate variations in the supply voltage.

The embodiment described above generally relate to AC inputs, which may be derived from the mains supply; the skilled person will immediately appreciate that the invention is not limited to mains supplies, and will embrace not only mains supply operating at 50 or 60 Hz but include AC supplies operating at other frequencies, for instance and without limitation, supplies operating at 400 Hz for use in marine or airborne systems.

The analysis above has been made, and the embodiments described, with reference to boundary conduction mode (BCM). However, it will be appreciated that use of an operating window, and window control, is advantageous not only in boundary conduction mode but also in continuous conduction mode (CCM). The invention is thus not to be read as being limited to BCM. In particular, the concept of increasing peak current to accommodate increasing load, only after the operating window has been expanded to a maximum value, is relevance to CCM operation, as is increasing the on-time Ton when the output voltage Vout is greater than twice the input voltage Vin. Of course, it will be readily appreciated that the optional feature of frequency clamping is not relevant or appropriate under CCM. Moreover, it will also be readily appreciated that for use with the invention, CCM can be implemented using either one of both of peak current mode control and average current mode control.

Moreover, it will be appreciated that references to "cycle" herein may refer interchangeably to either a complete 360° cycle, or to a 180° half-cycle.

Thus, viewed from one aspect, it will be appreciated that a Power Factor Corrector (PFC), typically used as the first stage of switched mode power supplies, particularly suited for Universal Mains inputs, has been disclosed, along with methods for controlling a switched mode power supply having power factor correction. In order to increase efficiency, particularly under low load conditions, without undue degradation of the Power Factor, the switching of the PFC circuit is confined to one or more operating windows within each half-cycle. In embodiments, the operating window comprises a small time window centred around the peak of the mains voltage. The higher the power level, the wider the switching window.

From reading the present disclosure, other variations and modifications will be apparent to the skilled person. Such variations and modifications may involve equivalent and other features which are already known in the art of PFCs, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of operating a switched mode power supply having power factor correction and supplied from an AC supply stage, the method comprising defining an operating window entirely within a half-cycle of the AC supply, and switching the power supply within the half-cycle only during the operating window and with an on-time of each switching cycle, wherein the operating window is an operating window such that a peak of the AC supply is included within the operating window, characterized in that, an output characteristic of the power supply is controlled by controlling the width of the operating window, wherein the switched mode power supply is supplied with an input voltage and outputs an output voltage, wherein the on-time of each switching cycle is controlled in dependence on the ratio between the output voltage and the input voltage such that the on-time is increased when the ratio between the output voltage and the input voltage exceeds a ratio threshold.

2. A method as claimed in claim 1, wherein the output characteristic is one of output power, output current and output voltage.

3. A method as claimed in claim 1, wherein the operating window is symmetrical about the peak of the AC supply.

4. A method as claimed in claim 1, wherein the on-time is one of constant and varied within the operating window.

5. A method as claimed in claim 4, wherein the on-time is varied between either successive half-cycles or between successive cycles.

6. A method as claimed in claim 1, wherein a peak switched current is one of constant and varied throughout the operating window.

7. A method as claimed in claim 6, wherein the peak switched current is varied between either successive half-cycles or between successive cycles.

8. A method as claimed in claim 1, wherein an average switched current is one of constant and varied throughout the operating window.

9. A method as claimed in claim 8, wherein the respective on-time, peak switched current or average switched current is varied between either successive half-cycles or between successive cycles.

10. A method as claimed in claim 1, wherein the switching frequency is constant throughout the operating window.

11. A method as claimed in claim 1, wherein an output characteristic is controlled by controlling the switching frequency, and wherein the switching frequency is constrained not to exceed a predetermined clamping frequency and further control is provided by controlling the width of the operating window.

12. A method as claimed in claim 1, wherein a sample-and-hold function is carried out at one of the peak of the half-cycle of the AC supply, and at least one of the end and the start of the operating window.

13. A method as claimed in claim 12, wherein an output from the sample-and-hold function is used for determining the width of the operating window for a subsequent half-cycle of the AC supply.

14. A method as claimed in claim 1, wherein the at least one operating window comprises a first side-window and a second side-window, such that the first side-window lies to one side of a peak of the AC supply and the second side-window lies to the other side of the peak of the AC supply.

15. A control circuit for a switched mode power supplied configured to operate according to a method as claimed in claim 1.

16. A switched mode power supply comprising a control circuit as claimed in claim 15.

* * * * *